United States Patent [19]

Niermann

[11] Patent Number: 5,076,792
[45] Date of Patent: Dec. 31, 1991

[54] RIDING SIMULATOR FOR A CYCLE, ESPECIALLY A MOTORCYCLE

[76] Inventor: Thomas Niermann, Keplerstrasse 96, W-4300 Essen 1, Fed. Rep. of Germany

[21] Appl. No.: 683,541

[22] Filed: Apr. 10, 1991

[30] Foreign Application Priority Data

Apr. 10, 1990 [DE] Fed. Rep. of Germany ....... 4012063

[51] Int. Cl.⁵ .......................... A63B 21/00; G09B 9/04
[52] U.S. Cl. .......................................... 434/61; 272/73
[58] Field of Search .............. 272/73, DIG. 4; 434/61

[56] References Cited

U.S. PATENT DOCUMENTS

| 4,580,983 | 4/1986 | Cassini et al. | 434/61 |
| 4,925,183 | 5/1990 | Kim | 434/61 |
| 4,932,651 | 6/1990 | Defaux | 272/73 |

Primary Examiner—Stephen R. Crow
Assistant Examiner—Glenn E. Richman
Attorney, Agent, or Firm—Sixbey, Friedman, Leedom & Ferguson

[57] ABSTRACT

A riding simulator for a cycle (1) with a supporting frame (2) with parallel, spaced riding simulation rollers (3, 4), on which front and rear wheels (5, 6) of a cycle (1) can run, is mounted in a supporting frame (2) with a crosswise rail (7) placed parallel to rollers (3, 4), with a runner (8) that is freely movable back and forth on or in the crosswise rail (7) but is positionally fixed crosswise relative to the rail (7), and a runner (8) that can be fastened by a link (9) to the frame (10) of the cycle (1) at a specific distance from the crosswise rail (7) so as to be able to swing around a horizontal pivot pin (11), and a rotating joint (12) between the runner (8) and the link (9) which allows only a rotation of link (9) relative to runner (8) around the longitudinal axis of a unit formed of the runner (8) and link (9). In a simple way, a realistic simulation of the riding and braking performance of the cycle is made possible by the crosswise rail (7) running near a plane of contact between contact surfaces of the rollers (3, 4) and the wheels of the cycle, and by the unit formed of the runner (8) and link (9) extending approximately horizontally from the crosswise rail (7).

19 Claims, 3 Drawing Sheets

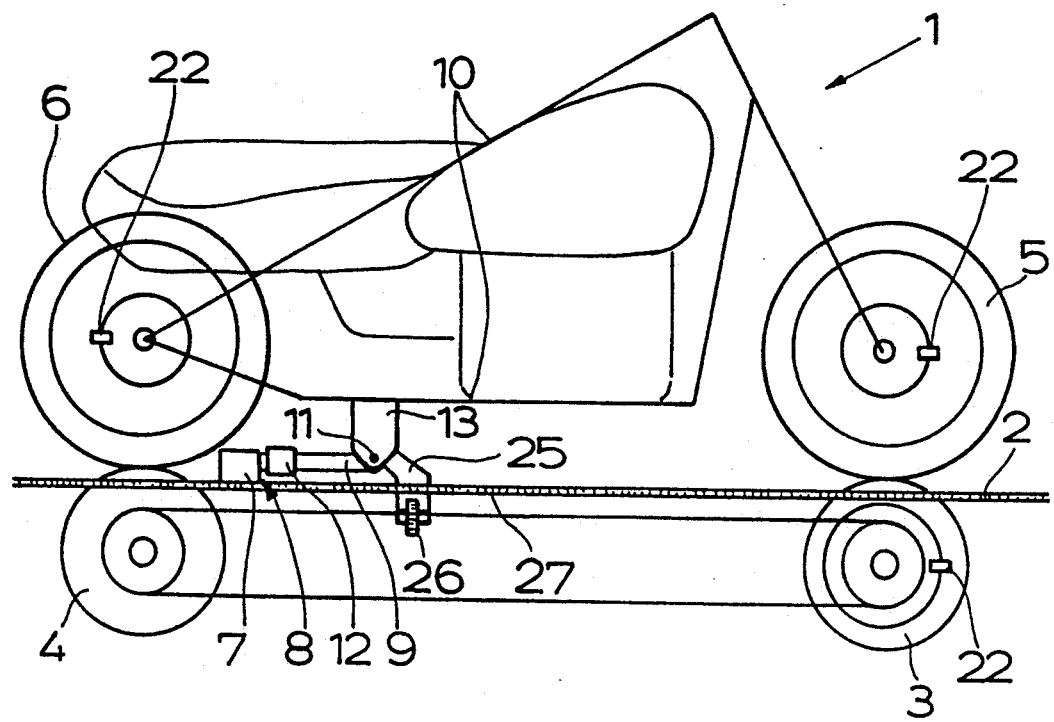
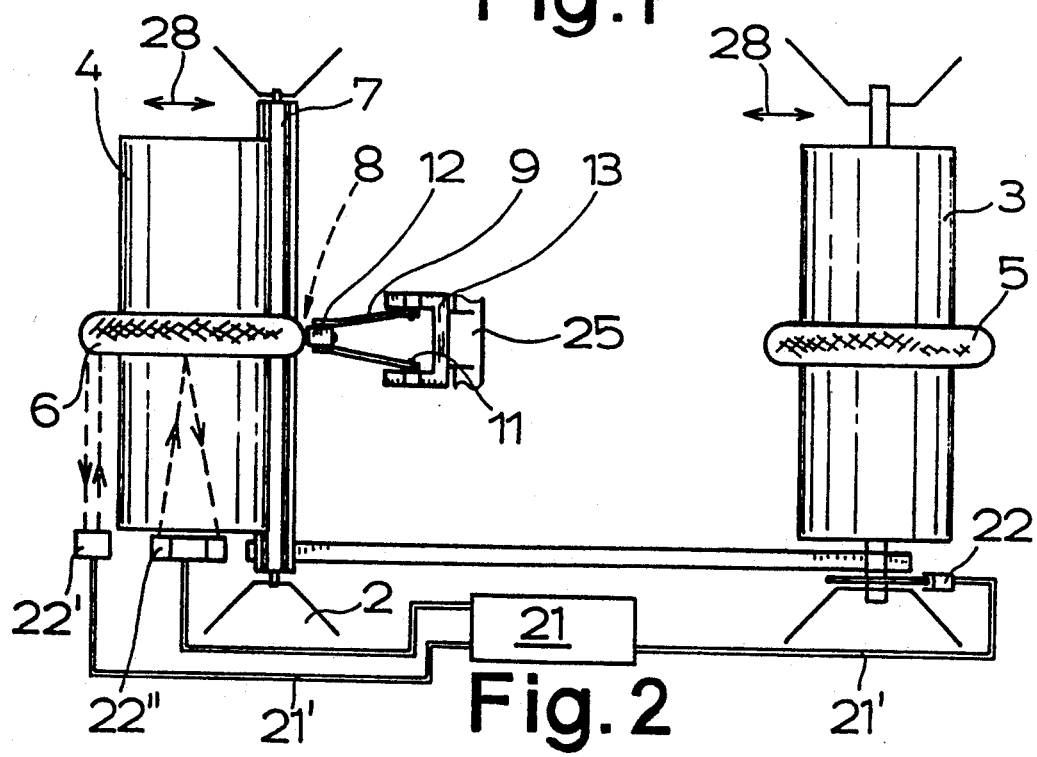

RIDING SIMULATOR FOR A CYCLE, ESPECIALLY A MOTORCYCLE

BACKGROUND OF THE INVENTION

The invention relates to a riding simulator in the form of a roller test stand for a cycle with a supporting frame having parallel riding simulation rollers on which a front wheel and a rear wheel of the cycle run, and which are mounted in the supporting frame a certain distance from one another and are drive-connected to one another by a crosswise rail that is placed on the supporting frame parallel to rollers. More particularly, to such a riding simulator where a runner is freely movable back and forth on or in the crosswise rail but is precisely guided crosswise to the crosswise rail, and where the runner can be fastened by a link to the frame of the cycle at a very specific distance from the crosswise rail so as to be able to swing around a horizontal pivot pin for limiting tipping of the cycle. Still further, where the unit formed of the runner and the link extends almost horizontally from the crosswise rail, and between the runner and the link, a rotating joint is provided, this rotating joint allowing only a rotation of the link relative to the runner around the longitudinal axis of the runner and link unit.

The known riding simulator, from which the invention originates (European Patent Application 0 121 186), is a riding simulator for a bicycle. It is essential that it be a riding simulator in the form of a roller test stand. In such a riding simulator, the front wheel and rear wheel of the cycle turn on riding simulation rollers that are drive-connected to one another. The gyro forces necessary for an autostabilization of the cycle are produced in the "riding operation." In this case, normally, the cycle will run under the muscular power of the rider or under its own engine power. Thus, in this case, the riding simulation rollers are driven by the cycle; although, it is also possible to drive the riding simulation rollers by a motor, so that the front wheel and rear wheel of the cycle are carried along. However, the cycle has to be maintained on the riding simulation rollers in an axial direction, so that it does not jump forward or backward. If that is achieved, the cycle laterally stabilizes itself in the "riding operation" on its own. For holding the cycle in the axial direction, the frame of the cycle is held on a runner by the crosswise rail that is parallel to the rollers.

In the known riding simulator, the crosswise rail in the "riding direction," is as a considerable distance behind the rear wheel of the cycle at a level somewhat above the axle of the rear wheel. This riding simulator does not allow considerable lateral tilting of the cycle since the rotating joint for the runner on the frame is at a relatively great distance from the contact surface of the roller carrying the rear wheel. Thus, if the bicycle leans, the rear wheel, because of the changing distance between crosswise rail and frame, either is lifted from the roller or is pulled down toward the back by the roller. Also, the tilted riding of the bicycle can take place only to a quite narrowly limited extent since the crosswise rail is located far behind the vertical axis running through the axle of the rear wheel around which a cycle turns in normal riding in turning corners.

The known riding simulator, explained above, is not well suited for the simulation of riding performance and braking performance of fast traveling cycles, especially, i.e., of motorcycles. Consequently, computer-controlled riding simulators are still used for motorcycles, in which the riding simulation of the motorcycle are reproduced only artificially, i.e., riding simulators, which do not have the form of a roller test stand (U.S. Pat. No. 4,887,967).

SUMMARY OF THE INVENTION

The object of the invention is to configure and further develop the initially explained riding simulator in the form of a roller test stand so that, in the simplest way possible, as realistic as possible a simulation of riding and braking performance is obtained for fast traveling cycles, especially for motorcycles.

The above-indicated object is achieved by the crosswise rail being near the roller that is intended for the rear wheel in proximity to a plane of contact between contact surfaces of the rollers and the cycle wheels. With the modified arrangement of the crosswise rail and its fastening to the frame of the cycle, the riding performance of the cycle during "riding operation" is not at all affected by this suspension. By the arrangement of a unit formed of the runner and link being in or near the plane which is defined by the points of contact of the wheels of the cycle on the rollers, the cycle can tilt laterally without the effective distances changing, i.e., with complete or almost complete maintaining of the longitudinal position of the front wheel and rear wheel on the rollers. Moreover, the crosswise rail, which practically forms the vertical axis around which the motorcycle can turn, is brought as close as possible to the position at which the vertical axis of turning occurs with a normal cycle traveling on the street.

With the above-explained measures, the desired practical riding simulation of the cycle on the riding simulator designed as a roller test stand is achieved.

Different possibilities are given below for configuring and further developing the riding simulator according to the invention so that it is more widely suitable for simulation of the riding and braking performance of motorcycles.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 1 is a diagrammatic representation in a side view of a preferred embodiment of a riding simulator according to the invention for a cycle, in this case a motorcycle;

FIG. 2 is the riding simulator of FIG. 1 in a top view, with only some of the parts of the cycle being shown;

DETAILED DESCRIPTION OF THE PREFERRED EMBODIMENT

Figure 3:
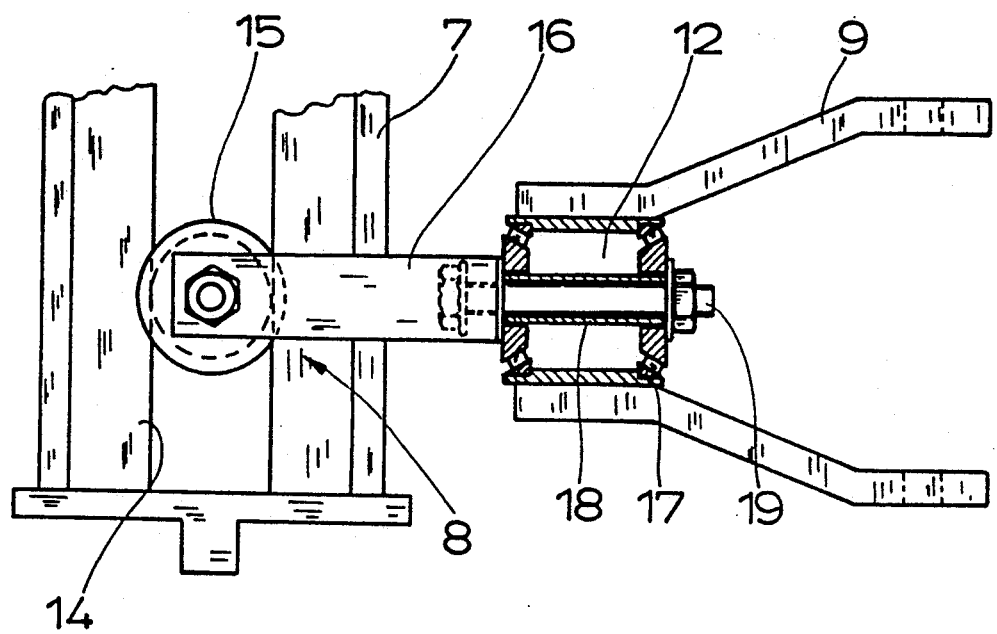
FIG. 3 shows a unit formed of a runner and link connected to a part of a crosswise rail of the riding simulator of FIG. 1.

The riding simulator represented in FIG. 1 is intended for simulation of the riding and braking performance of a cycle 1, in this case a motorcycle. Because of the high "speed" of a motorcycle, i.e., because of the relatively high speed of the wheels, according to the invention a special configuration of the riding simulator has been selected. Of course, the design according to the invention can also be used for a bicycle, but the invention is especially important for motorcycles.

The riding simulator 1 has a supporting frame 2 in which riding simulation rollers 3, 4 are mounted in parallel at a certain distance from one another and are drive-connected to one another by an endless belt B. Front wheel 5 and rear wheel 6 of the cycle 1 run on rollers 3, 4. A crosswise rail 7 runs parallel to rollers 3, 4, and is mounted on the supporting frame 2. In or on crosswise rail 7, a runner 8 is freely movable back and forth along its length, but is guided so that it is positionally fixed in a direction relative to the crosswise to the crosswise rail. Moreover, a tipping limiter of known construction is provided for motorcycle 1 which will be described later. By the tipping limiter, it is guaranteed that motorcycle 1 can assume only a certain maximum tilt to either sides, i.e., especially, it cannot tip over sideways.

Runner 8 is fastened by a link 9 (with which it forms a unit) to the frame 10 of the cycle 1, at a very specific distance from the crosswise rail 7, so as to be able to swing around a horizontal pivot pin 11. Between runner 8 and link 9 is a rotation joint 12, which allows the link 9 to rotate relative to runner 8 around the longitudinal axis of the unit formed of the runner 8 and link 9.

As is made clear in FIG. 2, rollers 3, 4 are at the distance from one another that is determined by the distance of the front wheel 5 from the rear wheel 6, and the unit of runner 8 and link 9 is exactly aligned on the center of the rear wheel 6.

FIGS. 1 and 2 together show that crosswise rail 7 runs near, preferably in, a plane spread between the contact surfaces of rollers 3, 4, and the wheels 5, 6. The unit of runner 8 and link 9 extends almost horizontally from crosswise rail 7. This has the advantages explained above.

Theoretically, as in the prior art, crosswise rail 7 could run behind the rear wheel 6. But, for design and riding reasons, an arrangement of crosswise rail 7, as represented in FIGS. 1 and 2, is especially preferred. Also, as shown, the crosswise rail 7 should be placed as close as possible to the rear wheel 6.

With a normal motorcycle 1, the lower edge of the frame 10, logically, is clearly above the plane formed by the contact surfaces of the front wheel 5 and the rear wheel 6 on rollers 3, 4. Therefore, it is recommended, as represented in FIG. 1, that pivot pin 11 of the link 9 be fastened to an auxiliary support 13 that can be fastened to the underside of the frame 10 of the cycle 1. Auxiliary support 13 can easily be fastened to frame 10 of a cycle 1, for example by clamps bolted onto the frame tubes of the usual double loop motorcycle frame. Of course, auxiliary support 13 has to be made so sturdy that forces occurring during simulation of riding and braking performance can be absorbed and transmitted.

Link 9 or auxiliary support 13 offer an ideal point of attachment for a tipping limiter. In the embodiment represented here, auxiliary support 13 is provided with a tipping limiter in the form of a support bracket 25. Rollers 26 are placed on the ends of the support bracket 25, each of which, when cycle 1 tilts more than a certain angle, abuts from below, on a contact surface 27 on supporting frame 2. By these rollers 26, which roll on the contact surface 27 on supporting frame 2, namely in the crosswise direction, a lateral crosswise shifting can take place with slight friction despite a tilted position of motorcycle 1.

Figure 4:
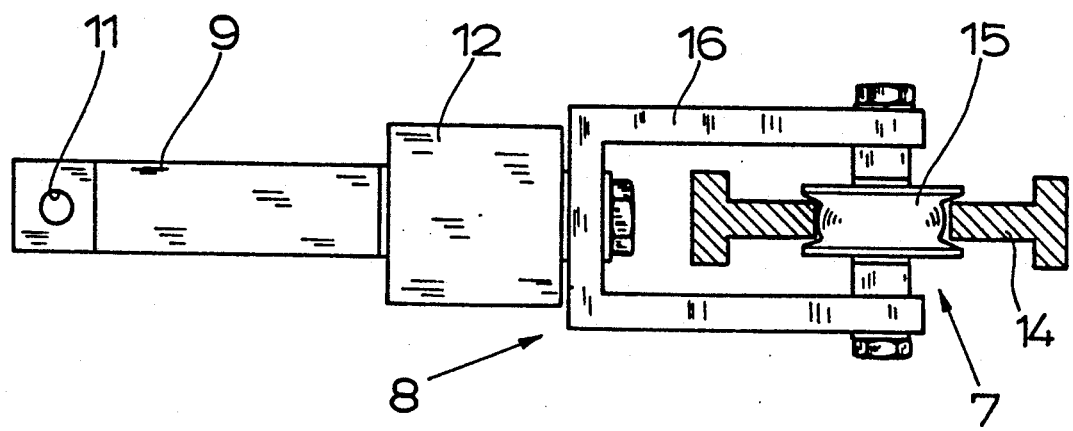
FIG. 4 is a side view of the unit represented in FIG. 3.

In FIGS. 3 and 4, an especially preferred configuration of crosswise rail 7 is shown in which two essentially horizontal facing rail heads 14 are provided and between which a spool-shaped roller 15 of runner 8 is placed. A fork 16 extends, in a claw-like manner, over the crosswise rail 7 from one side, and rotatably supports roller 15 between the ends of its legs.

In regard to rotational coupling 12, FIG. 3 shows a very reliably functioning system having a rotational coupling 12 with a double tapered antifriction bearing. This provides the necessary exact lateral guidance with easy rotatability around the longitudinal axis. How such double tapered antifriction bearings are designed and how their specified bearing forces can be adjusted is known from the prior art. In any event, in this case, the usual bearing retainer 17 and a spacer tube 18 is seen, which prevents an overstressing by screw coupling 19.

Figure 5:
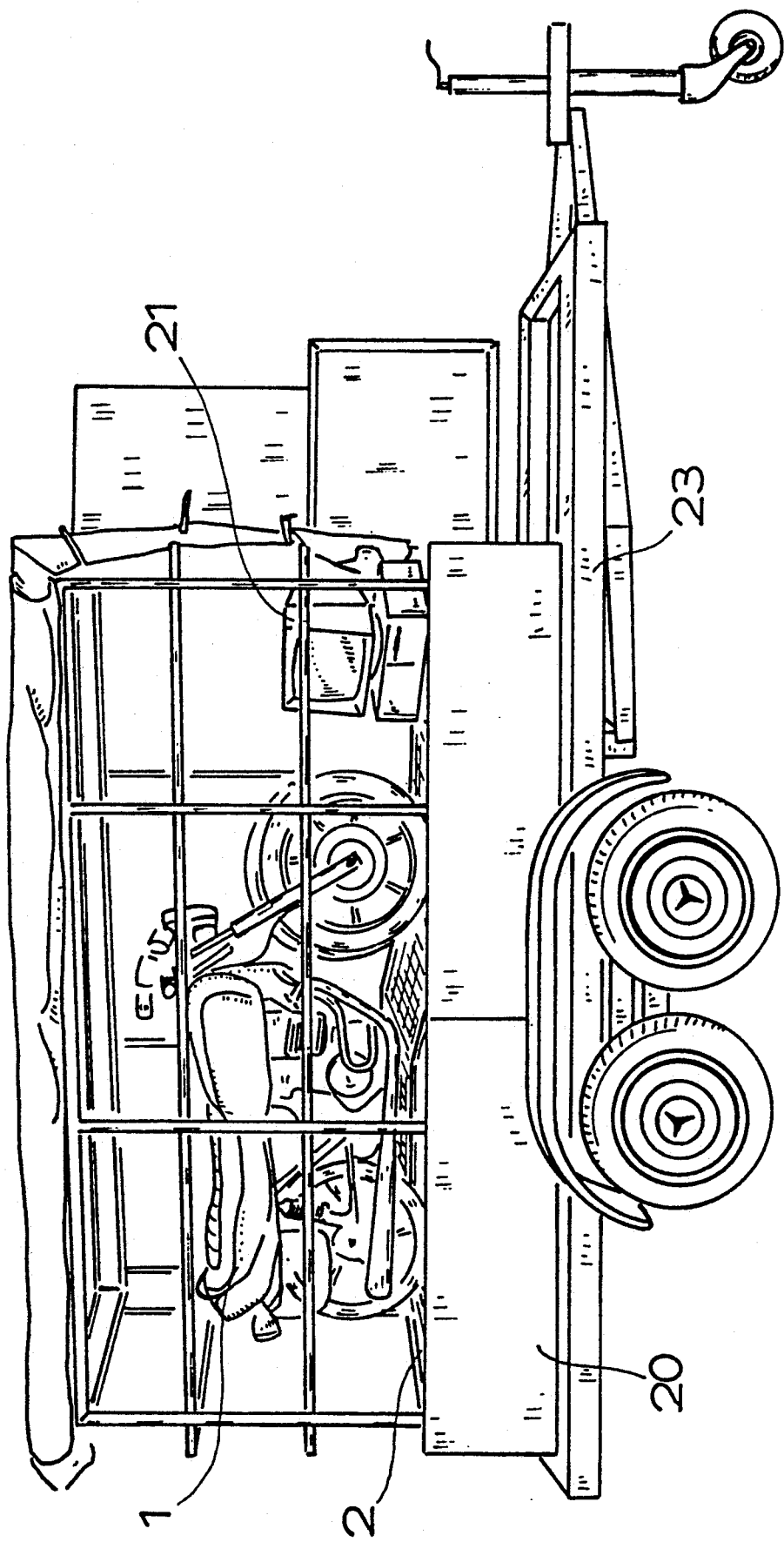
FIG. 5 shows the riding simulator according to the invention incorporated into a passenger car trailer in a side view.

So that cycle 1 will not laterally run off from rollers 3, 4, it is recommended that lateral crosswise movement restrains be associated with the rollers 3, 4. In this case, follower rollers resting on wheels 5, 6 of cycle 1 can be achieved. But, FIG. 5 makes it clear that the crosswise restraints, in this case, are achieved only by side walls 20 on supporting frame 2.

As indicated in FIG. 2 by double arrows 28, in the embodiment represented here, rollers 3, 4 can be shifted to adjust their distance from one another in supporting frame 2. Aside from the fact that such shifting accommodates the different wheel bases of different motorcycles 1, in this way, by the adjusting the distance between rollers 3, 4, the riding performance can also be affected within certain limits. For example, by moving roller 3 for front wheel 5 rearwardly, the caster can be changed, by which the steering and braking properties are greatly affected. In this case an optimal possibility of affecting the riding performance is found particularly for motorcycles.

It has been shown that, with the riding simulator according to the invention, the riding and braking performance can be simulated simply and realistically. Now such a riding simulator, in which the motorcycle actually does not make any riding movement, has one main physical drawback. The inertia of the masses, of the vehicle and rider normally exerting a strong influence in acceleration and braking is lacking. Normally the inertia of these masses, during braking, leads to a dynamic shifting of the axle load from the rear axle to the front axle, i.e. from the rear wheel 6 to the front wheel 5. Each motorcycle rider knows that the predominant braking power has to be produced by the front wheel brake.

In the framework of the present invention, a dynamic axle load shift during braking is simulated by the surface of the rear wheel roller 4 being provided with a coating that reduces the coefficient of friction, especially by being waxed. Since, for the simulation of the riding performance, less attention has to be given to acceleration than to braking (acceleration can, also, normally be practiced in driving school while, on the other hand, braking immediately leads to dangerous situations and, in any case, cannot be practiced in the extreme), the slight coefficient of friction of roller 4 can easily be considered by correspondingly slow acceleration. The slight coefficient of friction of roller 4, compared with the coefficient of friction of roller 3, thus becomes effective, first, in braking and leads to an action which, in an astonishing way, resembles the dynamic axle load shift. If a normal commercial roller is waxed on the surface, practically nothing further has to be done, the wax layer adheres for many weeks, even months. Alternatively, it would, of course, be possible to provide the surface of roller 4 with a coating applied at the start, for example, with a Teflon coating or the like.

So far, it has been assumed that, as in the prior art, with the riding simulator according to the invention, the cycle 1 itself provides the drive. Thus, it is possible to ride normally in the outdoors on the riding simulator according to the invention, also with respect to the engine noise and riding vibrations as on a normal motorcycle 1. But, indoors the ride should be without having to operate motorcycle 1, itself. Indoors, it is advisable that at least one of rollers 3, 4, be able to be driven by a drive motor, especially an electric motor, mounted in supporting frame 2.

Of course, it is advisable with motorcycle 1 not simply to "ride" on the riding simulator according to the invention, but also to document such a ride. This is of considerable importance for relatively long term measurements on motorcycle 1 but also for driving school purposes. Therefore, according to the invention, an electric evaluation computer 21 is provided and the speed of rollers 3, 4 and of wheels 5, 6 of cycle 1 as well as the crosswise position of cycle 1 on rollers 3,4 are used by evaluation computer 21 as measured values. The above-explained measured values allow slip by overbraking, steering deviations, etc. to be recognized sufficiently well. Of course, many other measured values can also be measured.

The speed measurement of the relevant speeds of rollers 3, 4 and the front wheel and the rear wheel 5, 6 can be made by usual mechanical or electromechanical methods. But, it has been shown that, for the use provided here, a measurement by light barrier sensors 22 for the roller-speed, 22' for the wheel-speed, and 22'' for the wheel-position or the like is suitable. Light barrier sensors 22 are immune to interference and are very exact. They are used in a way similar to that used, for example, with wheel balancing devices.

For the transmission of measured values or evaluation data, optical fiber cables 21' are recommended. It has been shown that considerable interferences start from the running engine of motorcycle 1, which are launched into the electronics by the cables if the usual electrical cables are used. On the other hand, optical fiber cables 21' are immune to interference.

In the prior art, a cooling ventilator is provided. The latter is recommended for cooling the engine of motorcycle 1, also, in the riding simulator according to the invention.

Further, according to the invention it has been recognized that a riding simulator of the kind under discussion is too expensive to be used always in one place only. Therefore, it is recommended to place the riding simulator on a passenger car trailer 23 or a small truck. Then this riding simulator can be made available to a many driving schools on a day rental basis to practice especially critical braking maneuvers with motorcycle 1. So far this has not been possible with justifiable expense in driving schools.

In tests with the riding simulator according to the invention, it has been shown that, with strong braking, there is a tendency for rear wheel 6 of motorcycle 1 to be drawn down toward the inside by rear roller 4. The cause of this is the yielding spring/shock absorber unit that has a considerable spring travel on the rear axle of motorcycle 1. It is recommended for the riding simulation to block spring/shock absorber unit 24 on rear wheel 6 of motorcycle 1 or to remove it and substitute a rigid connection.

While we have shown and described a single embodiment in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

I claim:

1. Riding simulator in the form of a roller test stand for a cycle with a supporting frame, parallel riding simulation rollers, on which a front wheel and a rear wheel of the cycle run, being mounted in the supporting frame at a distance from one another and being drive-connected to one another, a crosswise rail that is placed on the supporting frame parallel to the rollers, a runner which is freely movable back and forth along the crosswise rail but is precisely positioned crosswise relative to the crosswise rail, the runner being fastened by a link to a frame element of the cycle via an auxiliary support and a pivot pin for enabling rotation of the runner relative to the frame about a horizontal pivot axis wherein a unit formed of the runner and the link extends almost horizontally from the crosswise rail, in a longitudinal axis and between the runner and the link, a rotational coupling is provided, this rotational coupling allowing a rotation of the link relative to the runner around only the longitudinal axis of the runner and link unit; and wherein the crosswise rail runs is located near the roller for the rear wheel in close to a plane of contact extended between contact surfaces of the rollers and the wheels of the cycle.

2. Riding simulator according to claim 1, wherein the crosswise rail is located between the rollers.

3. Riding simulator according to claim 1, wherein the pivot pin of the link is fastened to an auxiliary support which is fastenable to an underside of the frame of the cycle.

4. Riding simulator according to claim 3, wherein the link or the auxiliary support has a tipping limiter in the form of a support bracket with guide rollers on the ends of the support bracket; and wherein, when the cycle tilts more than a certain angle to one side, a respective one of the rollers is supported against a contact surface on the supporting frame.

5. Riding simulator according to claim 1, wherein the crosswise rail comprises two essentially horizontal facing rail heads; and wherein the runner comprises a spool-shaped roller located between the rail heads and a fork which has a pair of legs that extend in a clawlike manner over the crosswise rail from one side, and which rotatably supports the spool-shaped roller between its legs.

6. Riding simulator according to claim 2, wherein the crosswise rail comprises two essentially horizontal facing rail heads; and wherein the runner comprises a spool-shaped roller located between the rail heads and a fork which has a pair of legs that extend in a clawlike manner over the crosswise rail from one side, and which rotatably supports the spool-shaped roller between its legs.

7. Riding simulator according to claim 1, wherein the rotational coupling comprises a double tapered antifriction bearing.

8. Riding simulator according to claim 5, wherein the rotational coupling comprises a double tapered antifriction bearing.

9. Riding simulator according to claim 6, wherein the rotating coupling comprises a double tapered antifriction bearing.

10. Riding simulator according to claim 1, wherein lateral crosswise restraints are positioned at ends of the rollers.

11. Riding simulator according to claim 1, wherein said distance of the rollers for the cycle wheels is adjustable in the supporting frame.

12. Riding simulator according to claim 1, wherein the surface of the roller for the rear wheel of the cycle has a coating of a friction reducing material thereon.

13. Riding simulator according to claim 1, wherein at least one of the rollers for the wheels of the cycle is drivable by a drive motor mounted in the supporting frame.

14. Riding simulator according to claim 1, comprising detecting means for detecting the speed of the rollers and of the wheels of the cycle as well as the crosswise position of the cycle on the rollers, and an electric evaluation calculator coupled to the detecting means so as to receive output therefrom for use as measured values.

15. Riding simulator according to claim 14, wherein said detecting means comprises light barrier sensors, for speed measurement.

16. Riding simulator according to claim 14, wherein the electric evaluation calculator is coupled to the detecting means by optical fiber cables.

17. Riding simulator according to claim 15, wherein the electric evaluation calculator is coupled to the detecting means by optical fiber cables.

18. Riding simulator according to claim 1, wherein the supporting frame is mounted on a passenger car trailer.

19. Riding simulator according to claim 1, wherein the link has a tipping limiter in the form of a support bracket with guide rollers on the ends of the support bracket; and wherein, when the cycle tilts more than a certain angle to one side, a respective one of the rollers is supported against a contact surface on the supporting frame.

* * * * *